UNITED STATES PATENT OFFICE.

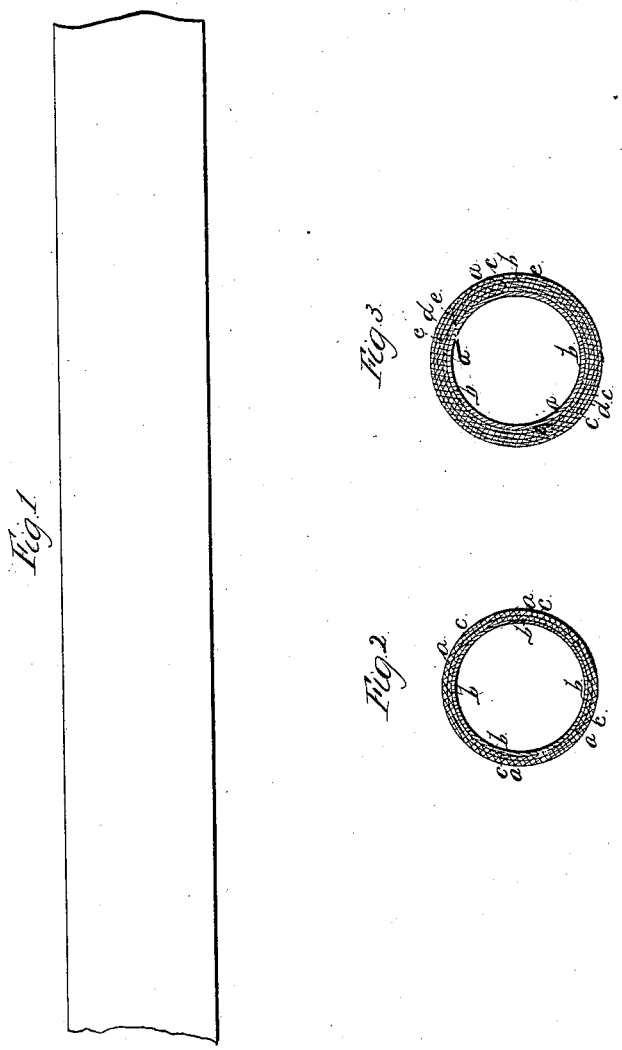

THOMAS J. MAYALL, OF ROXBURY, MASSACHUSETTS.

HOSE-TUBING.

Specification of Letters Patent No. 27,553, dated March 20, 1860.

*To all whom it may concern:*

Be it known that I, THOMAS J. MAYALL, of Roxbury, in the county of Norfolk and State of Massachusetts, have invented certain new and useful Improvements in the Manufacture of Hose or Tubing for Conveying Liquids, and that the following description, taken in connection with the accompanying drawings, hereinafter referred to, forms a full and exact specification of the same, wherein I have set forth the nature and principles of my said improvements by which my invention may be distinguished from all others of a similar class, together with such parts as I claim and desire to have secured to me by Letters Patent.

The figures of the accompanying plate of drawings represent my improvements.

Figure 1 is a plan or top view of my improved hose. Fig. 2 is a transverse vertical section of the same. Fig. 3 is a similar section showing a thicker hose.

Separate application for Letters Patent has heretofore been made by me for a new hose or tubing, which possesses many advantages over the various kinds of hose or tubing formerly used, and consists of a tube woven of cotton, flax or other fibrous material made without seams and lined with a coating or sheet of india rubber or gutta-percha.

The mode I have pursued of making this tubing or hose, is to first cover, by suitable means, the woven tube with a coating or encircling sheet of india-rubber or gutta-percha and then turn the hose thus formed inside out. This method answers very well for extremely light and thin hose but in making heavy and thick hose, I have found it difficult to turn,—where the woven tube is of the necessary thickness—the hose inside out without injuring and straining it.

To avoid this difficulty is the object of the present invention, which consists in first covering a tolerably thin woven tube with a sheet or coating of india-rubber or gutta-percha, and then turning the hose inside out as before explained. I then slip or draw over this woven tube another one of a little larger diameter than the first one and so as to fit tightly upon the same, and woven thicker if desired. In the same way, any number of woven tubes of increased diameter may be added, the result being a remarkably strong hose, made without difficulty and possessing a smooth or water proof bore or lining of india-rubber or gutta-percha. This method also enables me to make a much thicker hose of this kind than would otherwise be possible, the advantage of which will be manifest. The concentric woven tubes may, if desired, have a coating of india-rubber or gutta-percha, or of any suitable adhesive material or cement between them, but they are intended to be of such diameters respectively, as to fit one over the other with sufficient closeness as to bind and hold the whole firmly together.

$a\ a$ in the drawings represent the inner woven tube lined with a coating of india-rubber or gutta-percha $b\ b$, this coating being first applied and fastened to the outside of the tube by any suitable means and the tube then turned inside out. I then draw over this tube so prepared by means of any suitable device one or more concentric tubes $c, d, e$ &c. as shown in Figs. 2 and 3. In this manner a hose of any desired thickness may be readily formed and in which the woven tubes can not be injured or strained by turning them inside out as was heretofore necessary.

Having thus described my improvements, I shall state my claim as follows.

What I claim as my invention, and desire to have secured to me by Letters Patent is—

A hose or tubing formed of two or more concentric woven seamless tubes, composed of flax cotton or other fibrous materials, one over the other, the innermost one having a lining formed either wholly or in part of india-rubber or gutta-percha as set forth.

THOS. J. MAYALL.

Witnesses:
JOSEPH GAVETT,
A. W. BROWN.